May 24, 1960
C. B. HOUSE
2,938,129
VARIABLE FREQUENCY MAGNETIC MULTIVIBRATOR
Filed Jan. 21, 1958
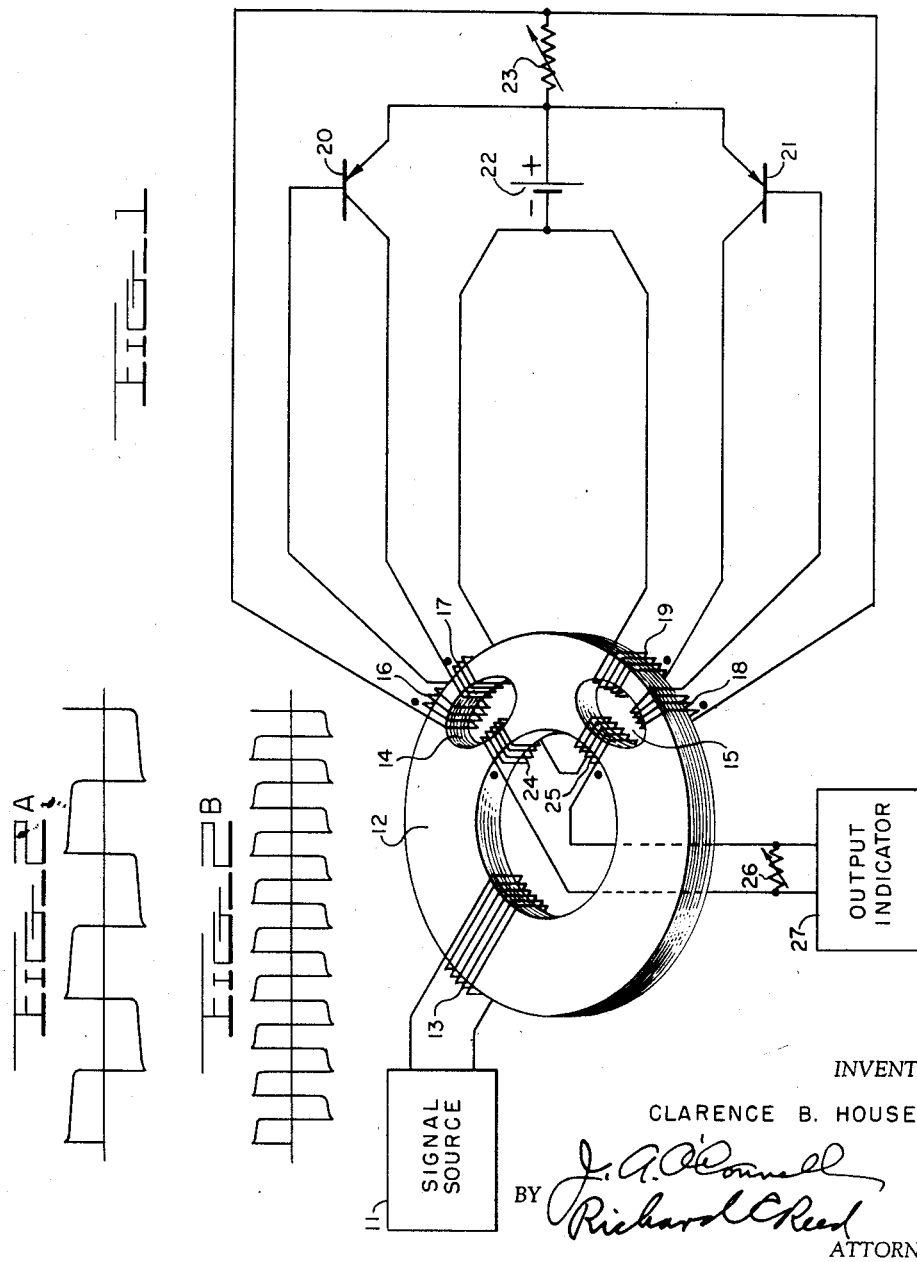
INVENTOR
CLARENCE B. HOUSE
ATTORNEYS United States Patent Office
2,938,129
Patented May 24, 1960

2,938,129

VARIABLE FREQUENCY MAGNETIC MULTIVIBRATOR

Clarence B. House, 3319 S. Wakefield, Arlington, Va.

Filed Jan. 21, 1958, Ser. No. 710,376

4 Claims. (Cl. 307—88)

(Granted under Title 35, U.S. Code (1952), sec. 266)

The invention described herein may be manufactured and used by or for the Government of the United States of America for governmental purposes without the payment of any royalties thereon or therefor.

This invention relates in general to information storage devices and in particular to magnetic information storage devices of the type employing material having a substantially rectangular hysteresis loop characteristic.

It will be appreciated that a compact assembly adapted to provide a reliable nonintegrating output in accordance with a variable input signal would be especially useful in unattended remote information detecting applications, for example, the earth satellite research program. In such applications it is sometimes desirable that the information be stored during one period and then continuously readout during a subsequent period via a communication network to the home base information collecting station. In addition, it is frequently desirable that the information storage device have minimum power requirement in order that the storage and readout processes may be continued over an extended time interval without servicing.

Accordingly:

It is an object of this invention to provide a reliable device for converting "peak current" information into an alternating voltage waveform, the frequency of which is proportional to the input information.

It is another object of this invention to provide a magnetic multivibrator wherein feedback between the multivibrator output and the multivibrator input is minimized.

It is a further object of this invention to provide a compact lightweight magnetic multivibrator having a minimum number of windings on the magnetic core.

It is still another object of this invention to provide a magnetic multivibrator which is relatively simple to construct.

It is an additional object of this invention to provide a multivibrator having several information inputs operable to vary the output frequency.

Other objects of this invention will become apparent upon a more comprehensive understanding of the invention for which reference is had to the following specification and drawings wherein:

Fig. 1 is a diagrammatic and schematic showing of a preferred embodiment of the present invention.

Figs. 2a and 2b are graphical showings of several output waveforms for the embodiment of Fig. 1.

Briefly, the device of this invention stores voltage information in a high remanance magnetic core of selected configuration and incorporates a multiwinding magnetic multivibrator such that the flux level in the magnetic core controls the frequency of the multivibrator output within a predetermined frequency range. By controlling the flux level of the magnetic core in accordance with desired input information, the frequency of the multivibrator output is caused to vary in accordance with the stored input information.

Referring now to the drawings:

Fig. 1 depicts a preferred embodiment of the device of this invention in a typical remote observation application. In Fig. 1 an input information source 11, shown in block diagram for purposes of simplicity, is inductively coupled to the magnetic core 12 via the winding 13. The input formation source 11 is illustrative of any device which produces a significant current output representative of a selected variable to be measured. In a solar observation application, for example, the source 11 might be an electrometer tube connected to an ion chamber which, in turn, measures a desired spectral line of impinging radiation at a determined geometric position in space. In such an application, the electrometer tube serves to amplify the minute current from the ion chamber to a useful magnitude. The amplified current flowing through the winding 13 on the core develops a magnetic field of sufficient magnitude to produce a change in the flux level of the core proportional to the minute current output of the ion chamber.

As shown in Fig. 1, the magnetic core 12 has a toroidal configuration and has two apertures indicated at 14 and 15 which are separated one from another. It will be noted that the diameter of each of the apertures is substantially less than the width of toroid and that the core is divided into two side portions, one to either side of the aperture in each case. Thus the core 12 has a continuous flux path around the toroid. For purposes of this disclosure the abovesaid flux path shall be termed the "primary" flux path.

The core 12 is of the type having a substantially rectangular hysteresis loop characteristic and is commonly referred to as a high remanance magnetic core. For example, the core may be a solid slab of ferromagnetic saturable material, such as 50% nickel-iron which is commercially available under the trade names "Orthonol," "Deltamax" and "Supermalloy." Alternatively the core may be laminated, as shown, to reduce eddy current losses.

In accordance with this invention the magnetic core assumes a certain flux level for a given peak current flowing in the control winding 13 and is unaffected by any subsequent currents of lesser magnitude than the previous peak current. Subsequent currents of greater magnitude will cause the core to assume a new flux level. That is, in the steady or storage state of this invention, the magnetic core does not integrate. It has been found that most types of high remanance toroid cores will respond as discussed above, provided the amount of current applied to the winding 13 does not exceed the amount of current required at saturation.

A two state multivibrator of the type generally described in the article "A Variable Frequency Magnetic-Coupled Multivibrator," by R. L. Van Allen, which appeared in AIEE Transactions, Part I, Communication and Electronics, vol. 74, pages 356–361, is shown connected to the core 12 via the windings 16 and 17 which are each wound through the aperture indicated at 14 and via the windings 18 and 19 which are each wound through the aperture indicated at 15. For a full and complete understanding of the operation of this type of multivibrator, reference is had to the above-mentioned article.

In general explanation of the two state multivibrator shown in the drawing, the device involves a first conducting loop which includes the winding 17 and a second conducting loop which includes the winding 19. The first and second conducting loops are alternately operative by means of the PNP type transistors 20 and 21 respectively, which perform a switching function in the device of this invention. The operation of the transistors 20 and 21 is controlled by the polarity across the windings 16 and 18, respectively.

As is well known in the art, in the operation of a PNP type transistor as a switching element, the collector to emitter impedance of the transistor is very high when both the collector and emitter voltages are equal to or more negative than the base voltage. As soon as the base becomes slightly negative with respect to the emitter, however, the collector to emitter impedance drops to a relatively low value, frequently to the vicinity of one ohm.

In Fig. 1 the emitter and collector of the transistor 20 are connected, via voltage source 22, across the winding 17 which is wound through the aperture indicated at 14. The base and emitter of the transistor 20 are connected via the impedance 23 across the winding 16 which is also wound through the aperture indicated at 14. Likewise, the emitter and collector of the transistor 21 are connected, via voltage source 22 across the winding 19 which is wound through the aperture indicated at 15. And the base and emitter of the transistor 21 are connected via the impedance 23 across the winding 18 which is also wound through the aperture indicated at 15.

Output windings 24 and 25 are wound through the apertures indicated at 14 and 15, respectively, and are serially connected across the load impedance 26 and the output indicator 27 is connected in parallel with the load impedance 26 such that it is responsive to the voltage appearing thereacross. In this embodiment, the impedance 26 may serve a two-fold purpose. Not only does the impedance 26 serve as a load impedance but it may also serve as another input information variable. That is, by the employment of a variable impedance, as shown, the impedance 26 may be used to control the operating frequency of the multivibrator. Of course, it is not essential to the device of this invention that the output indicator 27 be directly connected as indicated in the drawing. It will be appreciated that various different types of output indicators may be employed in a variety of different coupling arrangements to provide an output indication in accordance with the operating frequency of the multivibrator.

As discussed above, the control winding 13 is wound about another section of the toroid to produce a magnetic field within the toroid and thus to establish a determined flux level therein.

In operational analysis of the multivibrator shown in Fig. 1, for the initial condition, the control current output of source 11 is assumed to be zero and the emitter to collector impedance of transistor 20 is low while the collector to emitter impedance of transistor 21 is relatively high. In other words, transistor 20 is in the conducting state and transistor 21 is in the nonconducting state.

Thus, in the initial condition, the core 12 in the region surrounding the aperture indicated at 14 is actively proceeding to saturation and the induced voltages are in the polarity relationship indicated by the dots in Fig. 1. When the core in the abovesaid region reaches the knee of the hysteresis loop, saturation occurs, transistor 20 starts to open and flux collapse in the region of the aperture 14 causes all the indicated induced voltages to reverse polarity. The next half cycle begins with the transistor 21 in the conducting state, and the transistor 20 in the nonconducting state. The frequency of operation depends upon the amount of total flux change which occurred in the active core area during the previous half cycle of operation. The core in the region surrounding the aperture indicated at 14 is coupled to the core in the region surrounding the other aperture by means of the output windings 24 and 25. The windings 24 and 25 are wound such that during each half cycle the voltage across the winding in the inactive area serves to reset the flux level therein. In this embodiment the resetting voltage across the output winding 25 is somewhat less than that appearing across the output winding 24. In this embodiment, the resetting core region is not reset completely by the active core region.

The zero control current frequency of the multivibrator is determined by the current flow in the windings 16 and 18. Thus the zero control current frequency of the multivibrator may be varied by adjustment of the magnitude of the impedance 23 in the load circuit.

In accordance with this invention, the output frequency of the multivibrator varies from the zero control current frequency in accordance with variation in the flux level in the toroid 12 as effected by the magnetic field produced by current flow in the winding 13. Fig. 2a is illustrative of the output of the multivibrator for the zero input condition, that is for the unsaturated core condition at the midpoint of the core hysteresis loop. The waveform depicted in Fig. 2b is also illustrative of the output of the embodiment of this invention as shown in Fig. 1, but in another operational state. This square waveform represents the output of the multivibrator for the condition wherein the main core is partially saturated due to the magnetic field produced by current flow in the winding 13. It will be noted that the frequency of the waveform shown in Fig. 2b is greater than the frequency of the waveform shown in Fig. 2a. In accordance with the basic principle of this invention, the difference in frequency with respect to the reference frequency (Fig. 2a) is proportional to the saturation condition of the main core. Thus the difference in frequency is indicative of the peak current input to the device from the input information source 11. It will be appreciated that the difference in frequency will increase as the peak input current applied, in proportion thereto.

As is well known in the art, the flux level in a magnetic core of the type employed in this invention will be maintained over an extended interval of time provided no magnetic field of greater magnitude or of opposing direction is applied to return the flux level to its original condition during this time interval. It has been assumed in the discussion above that a unidirectional input current has been applied to the winding 13 from the information source 11. Since the toroidal core shown is responsive only to current information of greater magnitude than the magnitude of any previous current information it will be seen that the difference in frequency in the multivibrator output is indicative of the highest magnitude input current from the source 11.

By the unique structural arrangement described herein, the input circuitry is isolated from the oscillator circuitry and relatively large currents in the oscillator windings have a minimum effect on the input. Thus the problem of memory destruction due to feedback which has been a source of major difficulty in magnetic multivibrators of the storage variety, has been greatly reduced by the device of this invention.

Moreover, by the separated disposition of windings in the device of this invention, the assembly of the device has been considerably simplified.

It is understood, of course, that this invention is not limited to applications involving a unidirectional input current. The effect of an input current of reverse direction through the winding 13 would be a reversal in the direction of the magnetic field applied to the core 12. Provided the reverse magnetic field is of sufficient magnitude, the flux level will decrease in proportion to the reverse current flow in the winding 13. Just as in the first described instance, the change in flux level in the reverse direction is also representative of peak current flow in the winding 13. In other words, current of greater magnitude than the magnitude of any previous current information is required to change the flux level. Of course, a change in flux level in the reverse direction appears in the output of the multivibrator as a reduction in the frequency difference with respect to the reference frequency.

It is understood, of course, that this invention is not to be limited to the particular embodiment which has been exemplarily described and shown herein. For example, other high remanance two state magnetic multivibrators the output frequency of which is dependent upon the portion of the hysteresis loop involved during each state may be readily substituted for the magnetic multivibrator described in detail in this specification.

What is claimed is:

1. A magnetic storage device for the storage and readout of desired information comprising a slab of magnetic material having a substantially rectangular hysteresis loop characteristic, said slab having a toroidal ring configuration and having at least first and second apertures in first and second sections of said toroid ring, respectively, the axes of said apertures being substantially parallel to the axis of said toroid configuration, a first winding wound on said toroid slab through the center thereof and encircling a third section of said toroid ring; first electrical energy means connected to said first winding and operative to change the flux level in the flux path around said toroid ring in accordance with the desired information; second and third windings wound on said toroid ring through said first and second apertures, respectively; second electrical energy means; first and second on-off switching means; said second winding, said second electrical energy means and said first on-off switching means being serially connected to form a first current conductive loop; said third winding, said second electrical energy means and said second on-off switching means being serially connected to form a second current conductive loop; said first current conductive loop being operative to change the flux level in the flux path around said first aperture in a selected direction; said second current conductive loop being operative to change the flux level around said second aperture in a selected direction; each of said first and second switching means being alternately conductive in accordance with the flux level condition in flux path around said first and second apertures, respectively, means for reversing the conduction condition of said switching means when the flux level in the flux paths around said first and second apertures reach a saturation condition, means for changing the flux level in the flux paths around said first and second aperture in the reverse direction when the abovesaid saturation condition is reached; and frequency responsive output means operative in accordance with the alternate operation of said first and second switching means.

2. A magnetic storage device for the storage and readout of desired information comprising a slab of magnetic material having a substantially rectangular hysteresis loop characteristic, said slab having a toroidal ring configuration and having at least first and second apertures in first and second sections of said toroid ring, respectively, the axes of said apertures being substantially parallel to the axis of said toroid configuration, a first winding wound on said toroid slab through the center thereof and encircling a third section of said toroid ring; first electrical energy means connected to said first winding and operative to change the flux level in the flux path around said toroid ring in accordance with the desired information; second and third windings wound on said toroid ring through said first and second apertures, respectively; second electrical energy means; first and second on-off transistor type switching means; said second winding, said second electrical energy means and said first on-off switching means being serially connected to form a first current conductive loop; said third winding, said second electrical energy means and said second on-off switching means being serially connected to form a second current conductive loop; said first current conductive loop being operative to change the flux level in the flux path around said first aperture in a selected direction; said second current conductive loop being operative to change around said second aperture in a selected direction; each of said first and second switching means being alternately conductive in accordance with the flux level condition in flux path around said first and second apertures, respectively; means for reversing the conduction condition of said switching means when the flux level in the flux paths around said first and second apertures reach a saturation condition, means for changing the flux level in the flux paths around said first and second aperture in the reverse direction when the abovesaid saturation condition is reached; and frequency responsive output means operative in accordance with the alternate operation of said first and second switching means.

3. A magnetic storage device for the storage and readout of desired information comprising a slab of magnetic material having a substantially rectangular hysteresis loop characteristic, said slab having a toroidal ring configuration and having at least first and second apertures in first and second sections of said toroid ring, respectively, the axes of said apertures being substantially parallel to the axis of said toroid configuration, a first winding wound on said toroid slab through the center thereof and encircling a third section of said toroid ring; first electrical energy means connected to said first winding and operative to change the flux level in the flux path around said toroid ring in accordance with the desired information; second and third windings wound on said toroid ring through said first and second apertures, respectively; second electrical energy means; first and second on-off switching means; said second winding, said second electrical energy means and said first on-off switching means being serially connected to form a first current conductive loop; said third winding, said second electrical energy means and said second on-off switching means being serially connected to form a second current conductive loop; said first current conductive loop being operative to change the flux level in the flux path around said first aperture in a selected direction; said second current conductive loop being operative to change the flux level around said second aperture in a selected direction; each of said first and second switching means being alternately conductive in accordance with the flux level condition in flux path around said first and second apertures, respectively; means for reversing the conduction condition of said switching means when the flux level in the flux paths around said first and second apertures reach a saturation condition, means for changing the flux level in the flux paths around said first and second aperture in the reverse direction when the abovesaid saturation condition is reached; variable means for controlling the rate of change in the flux level in the flux paths around said first and second apertures in the reverse direction; and frequency responsive output means operative in accordance with the alternate operation of said first and second switching means.

4. A magnetic storage device for the storage and readout of desired information comprising a slab of magnetic material having a substantially rectangular hysteresis loop characteristic, said slab having a toroidal ring configuration and having at least first and second apertures in first and second sections of said toroid ring, respectively, the axes of said apertures being substantially parallel to the axis of said toroid configuration, a first winding wound on said toroid slab through the center thereof and encircling a third section of said toroid ring; first electrical energy means connected to said first winding and operative to change the flux level in the flux path around said toroid ring in accordance with the desired information; second and third windings wound on said toroid ring through said first and second apertures, respectively; second electrical energy means; first and second on-off transistor type switching means; said second winding, said second electrical energy means and said first on-off switching means being serially connected to form a first current conductive loop; said third winding, said second electrical energy means and said second on-off switching means being serially connected to form a second current conductive loop; said first current conductive loop being operative to change the flux level in the flux path around said first aperture in a selected direction; said second current conductive loop being operative to change the flux level around said second aperture in a selected direction; each of said first and second switching means being alternately conductive in accordance with the flux level condition in flux path around said first and second apertures, respectively; means for reversing the conduction condition of said switching means when the flux level in the flux paths around said first and second apertures reach a saturation condition, means for changing the flux level in the flux paths around said first and second aperture in the reverse direction when the abovesaid saturation condition is reached; variable means for controlling the rate of change in the flux level in the flux paths around said first and second apertures in the reverse direction; and frequency responsive output means operative in accordance with the alternate operation of said first and second switching means.

References Cited in the file of this patent
UNITED STATES PATENTS 2,818,555     Lo _____ Dec. 31, 1957

OTHER REFERENCES

Publication AIEE Transactions, Part I, Communications and Electronics, volume 74, pages 356–361, 1955.